(12) United States Patent
Pettus

(10) Patent No.: US 12,231,936 B2
(45) Date of Patent: Feb. 18, 2025

(54) API DRIVEN REMOTE RADIOFREQUENCY FRONT END DEVICE AND METHODS OF USE THEREOF

(71) Applicant: Vubiq Networks, Inc., Irvine, CA (US)

(72) Inventor: Michael Gregory Pettus, San Juan Capistrano, CA (US)

(73) Assignee: VUBIQ NETWORKS, INC., Irvine, CA (US)

( * ) Notice: Subject to any disclaimer, the term of this patent is extended or adjusted under 35 U.S.C. 154(b) by 367 days.

(21) Appl. No.: 17/507,695

(22) Filed: Oct. 21, 2021

(65) Prior Publication Data

US 2022/0132352 A1 Apr. 28, 2022

Related U.S. Application Data

(60) Provisional application No. 63/104,706, filed on Oct. 23, 2020.

(51) Int. Cl.
*H04W 24/10* (2009.01)
*G06F 9/54* (2006.01)
(Continued)

(52) U.S. Cl.
CPC ............ *H04W 24/10* (2013.01); *G06F 9/547* (2013.01); *H04B 1/405* (2013.01); *H04L 5/14* (2013.01)

(58) Field of Classification Search
CPC .................................. H04W 24/10; H04L 5/14
See application file for complete search history.

(56) References Cited

U.S. PATENT DOCUMENTS

| 10,051,110 B2 | 8/2018 | Dave et al. |
| 2006/0114853 A1* | 6/2006 | Hasty, Jr. ............... H04W 88/02 370/329 |

(Continued)

FOREIGN PATENT DOCUMENTS

CA 3007818 A1 7/2021

OTHER PUBLICATIONS

International Search Report and Written Opinion for International Patent Application No. PCT/US21/56107 (mailed Feb. 8, 2022).

(Continued)

*Primary Examiner* — Zhiren Qin
(74) *Attorney, Agent, or Firm* — Troutman Pepper Locke LLP (Rochester)

(57) ABSTRACT

A radiofrequency frontend device includes a transceiver configured to transmit and receive electromagnetic radiation in a Millimeter wave (mmWave) radio frequency (RF) spectrum. One or more application programming interface (API) interface devices are configured to receive API calls from a remote source. A processor is coupled to the one or more API interface devices and the transceiver. The radiofrequency frontend device also includes a memory comprising programmed instructions stored in the memory. The processor is configured to execute the programmed instructions stored in the memory to receive one or more API calls from the one or more API interface devices for monitoring or controlling the transceiver and execute one or more monitor or control functions for the transceiver based on the received API calls from the remote source. A method of making a radiofrequency frontend device is also disclosed.

26 Claims, 4 Drawing Sheets

(51) Int. Cl.
H04B 1/405 (2015.01)
H04L 5/14 (2006.01)

(56) References Cited

U.S. PATENT DOCUMENTS

| | | | |
|---|---|---|---|
| 2010/0039937 A1* | 2/2010 | Ramanujan | H04L 47/263 370/235 |
| 2010/0081440 A1* | 4/2010 | Reddy | H04W 88/02 455/450 |
| 2011/0212700 A1* | 9/2011 | Petite | G01S 19/17 455/404.1 |
| 2015/0222361 A1* | 8/2015 | Dhaini | H04Q 11/0067 398/66 |
| 2016/0261337 A1* | 9/2016 | Mukai | H04B 10/03 |
| 2016/0380745 A1* | 12/2016 | Wu | H04L 5/1438 370/277 |
| 2017/0006424 A1* | 1/2017 | Liin | H04W 4/023 |
| 2017/0222613 A1* | 8/2017 | Yehezkely | H01L 23/50 |
| 2018/0180713 A1 | 6/2018 | Cohen et al. | |
| 2018/0184330 A1 | 6/2018 | Egner et al. | |
| 2019/0056725 A1* | 2/2019 | Su | G06F 1/163 |
| 2020/0137745 A1 | 4/2020 | Bachu et al. | |

OTHER PUBLICATIONS

Sooriyabandara et al., "Unified Link Layer API: A Generic and Open API to Manage Wireless Media Access," Computer Communications 31:962-979 (2008).

Extended European Search Report for European Application No. 21883929.8 (mailed Jul. 26, 2024).

* cited by examiner

API DRIVEN REMOTE RADIOFREQUENCY FRONT END DEVICE AND METHODS OF USE THEREOF

This application claims the benefit of Provisional Patent Application Ser. No. 63/104,706, filed Oct. 23, 2020, which is hereby incorporated by reference in its entirety.

FIELD

This technology generally relates to radiofrequency frontend devices, and in particular, to application programming interface driven millimeter wave radiofrequency frontend device and methods of making and use thereof.

BACKGROUND

As networking equipment becomes more software defined and software independent, the evolution of software defined networks (SDN) is changing the topology of high speed communications systems. For various network equipment types, control and management is administered separately from the hardware with central controllers allowing for easier configuration and administration. Wireless communications links are used for both access and backhaul where fiber and cable are not available. Traditionally, the wireless terminal had its own network controller and, in some cases, its own Ethernet switch. This put the wireless link terminal into the category of an independent network element. As such, a network element requires special software interfaces for the network controller or switch with its unique set of management information bases (MIBs) and unique graphical user interface (GUI) for integration into the central network management system. Not only did this place an additional software development burden on the network administrator, but it also forced the wireless terminal to have a larger physical footprint, dissipate more power, and cost more to manufacture.

Millimeter wave (mmWave) radio frequency (RF) spectrum allows huge bandwidths due to the frequencies of operation in the 30 to 300 GHz extremely high frequency (EHF) portion of the radio spectrum. Wireless communications systems that make use of these EHF frequencies can achieve multi-gigabit data transport that compliments cable and fiber based networks. With the advent of lower cost mmWave semiconductor packaging technologies, along with integration of simple digital control and monitoring of fundamental wireless radio key parameters, such as setting RF gain and RF frequency, and monitoring of transmitter power and modulation characteristics, digital management of a wireless radio can be greatly simplified. Leveraging full duplex system design allows very low latency wireless connectivity, which for the emerging networks supporting high speed data and voice in 5G and 6G is critically important.

SUMMARY

One aspect of the present technology relates to a radiofrequency frontend device. The radiofrequency frontend device includes a transceiver configured to transmit and receive electromagnetic radiation in a Millimeter wave (mmWave) radio frequency (RF) spectrum. One or more application programming interface (API) interface devices are configured to receive API calls from a remote source. A processor is coupled to the one or more API interface devices and the transceiver. The radiofrequency also includes a memory comprising programmed instructions stored in the memory. The processor is configured to execute the programmed instructions stored in the memory to receive one or more API calls from the one or more API interface devices for monitoring or controlling the transceiver and execute one or more monitor or control functions for the transceiver based on the received API calls from the remote source.

Another aspect of the present technology relates to a method of making a radiofrequency frontend device. A transceiver configured to transmit and receive electromagnetic radiation in a Millimeter wave (mmWave) radio frequency (RF) spectrum is provided. One or more application programming interface (API) interface devices configured to receive API calls from a remote source are also provided. A processor is coupled to the one or more API interface devices and the transceiver. A memory comprising programmed instructions stored in the memory is provided. The processor is configured to execute the programmed instructions stored in the memory to receive one or more API calls from the one or more API interface devices for monitoring or controlling the transceiver and execute one or more monitor or control functions for the transceiver based on the received API calls from the remote source.

The present technology provides a number of advantages including providing a lower complexity full duplex wireless radio design that is driven by API calls received through a dedicated interface and thus does not need to perform any network functionality. This reduces the size and power requirements for the radio device, which allows the device to be employed in a number of applications that require a small footprint millimeter radio device. Further, the wireless terminal can be operated remotely without the need for the remote source to interface with any specific networking applications for communicating with the radio device. Thus, the wireless terminal can be easily introduced into an SDN, for example.

DETAILED DESCRIPTION

Figure 1:
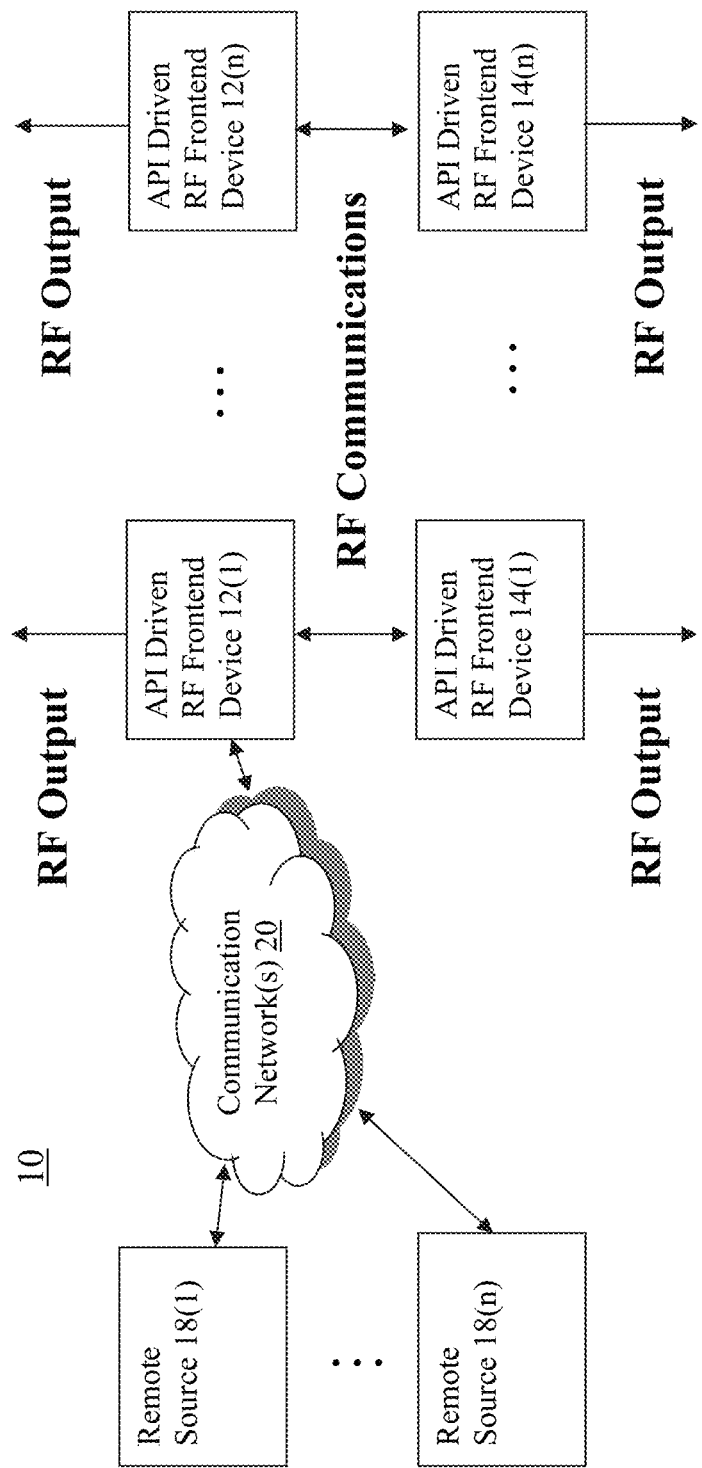
FIG. 1 is a block diagram of an environment including a plurality of exemplary application programming interface (API) driven radiofrequency frontend devices of the present technology.

An environment 10 including a first set of application programming interface (API) driven radiofrequency frontend devices 12(1)-12(n) and a second set of API driven radiofrequency frontend devices 14(1)-14(n) is illustrated in FIG. 1. The first set of the API driven radiofrequency frontend devices 12(1)-12(n) have dedicated API interface devices, as described in further detail below. The first set of API driven radiofrequency frontend devices 12(1)-12(n) are coupled to one or more remote source(s) 18(1)-18(n) through communication network(s) 20. In one example, the remote sources 18(1)-18(n) are part of a software defined network (SDN) network management system. The first set of API driven radiofrequency frontend devices 12(1)-12(n) (with dedicated API interface devices) are configured to receive API calls from the remote source(s) 18(1)-18(n) through the dedicated API interface devices, as described in further detail below, and execute one or more monitor or control functions for a transceiver of the API driven radiofrequency frontend devices based on the received API calls from the remote source(s) 18(1)-18(n), as described below. The second set of the API driven radiofrequency frontend devices 14(1)-14(n), which do not have dedicated API interface devices, are coupled to the first set of the API driven radiofrequency frontend devices 12(1)-12(n) as wireless links. The first set of API driven radiofrequency frontend devices 12(1)-12(n) and the second set of API driven radiofrequency frontend devices 14(1)-14(n) communicate using electromagnetic radiation (RF output), for example, in a Millimeter wave (mmWave) radiofrequency spectrum, which may include the API calls from remote source(s) 18(1)-18(n) to control or monitor functions of the second set of API driven frontend devices 14(1)-14(n) without dedicated API interface devices.

Figures 2A, 2B:
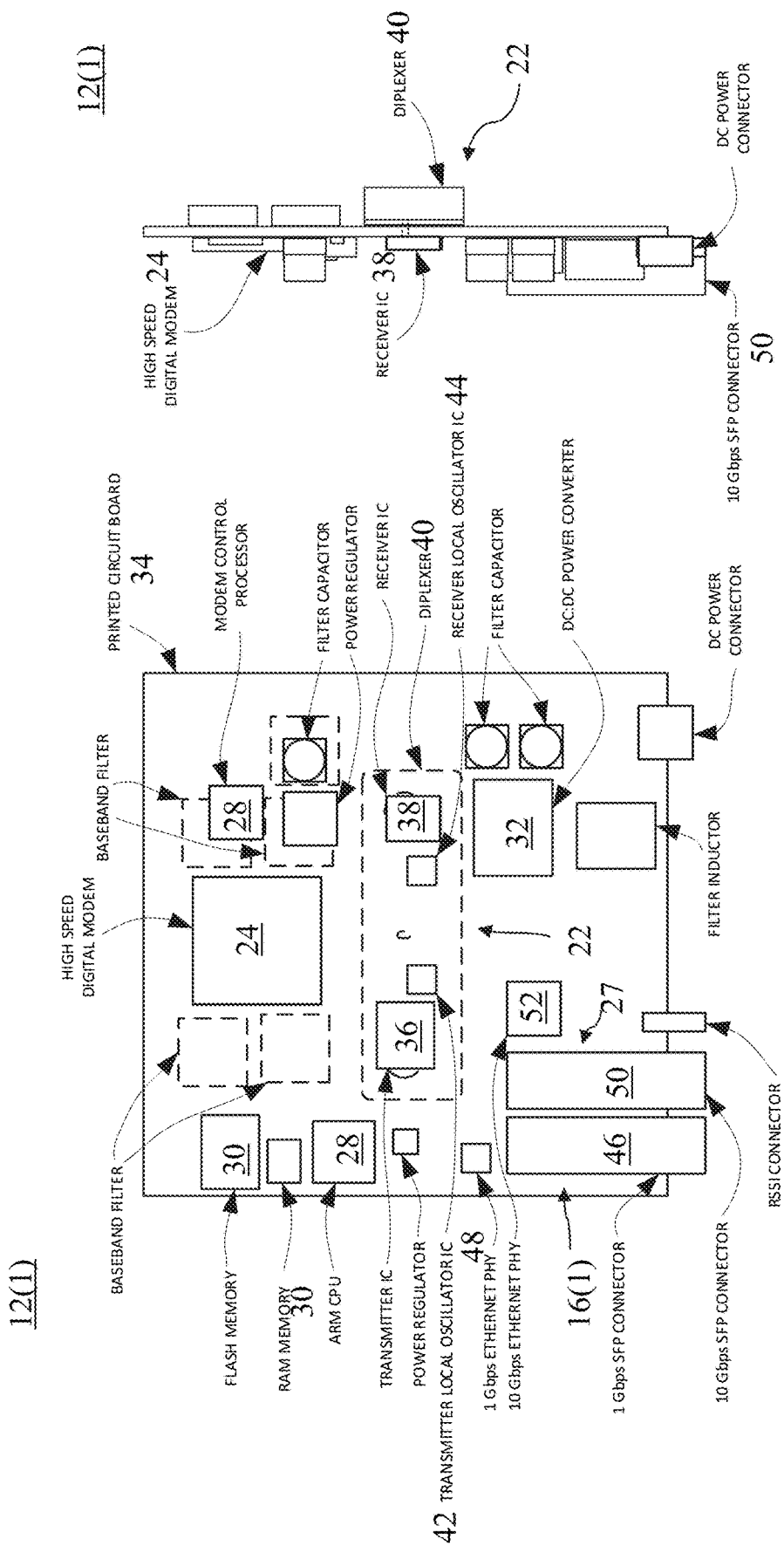
FIGS. 2A and 2B are top and side views of physical layouts of one of the exemplary API driven radiofrequency frontend devices having dedicated API interfaces as shown in FIG. 1.
Figure 3:
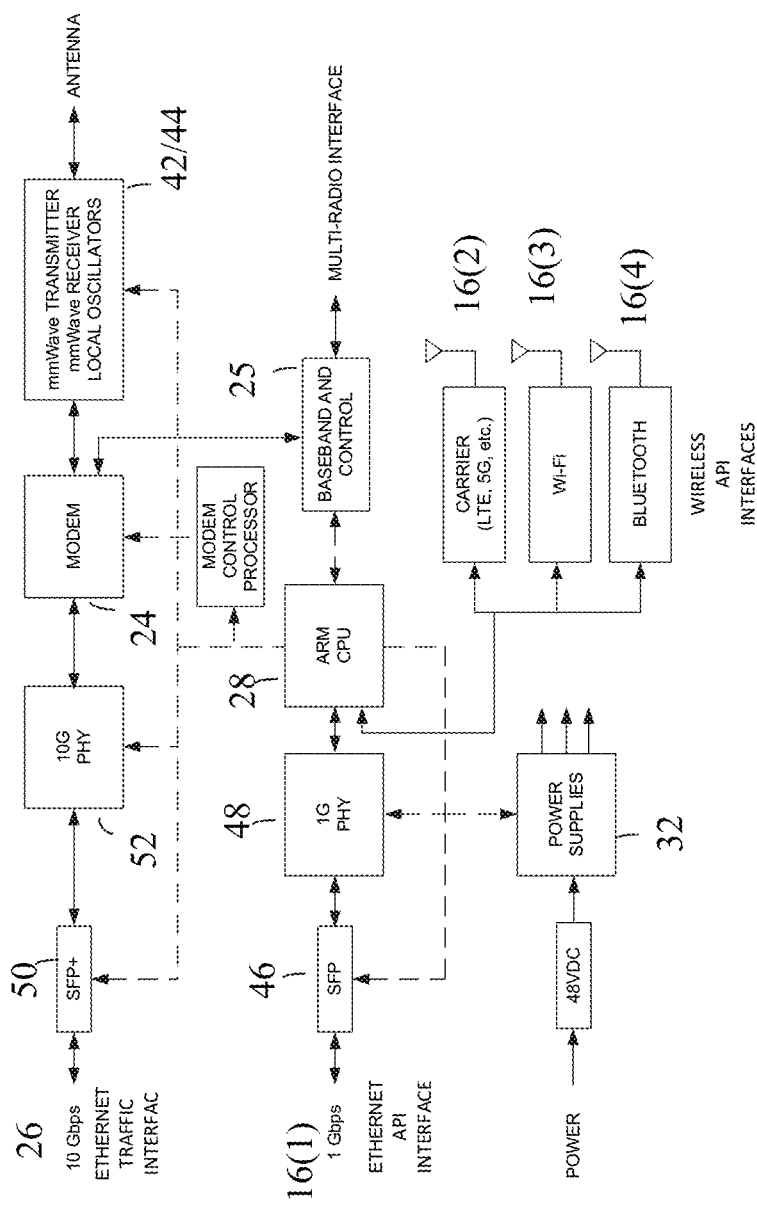
FIG. 3 is a block diagram a portion of the exemplary API driven radiofrequency frontend device shown in FIG. 2.

Referring now more specifically to FIGS. 2A, 2B, and 3, an exemplary API driven radiofrequency frontend device 12(1) of the present technology is illustrated. API driven radiofrequency frontend device 12(1) includes a transceiver device 22, a modem 24, one or more API interface devices 16(1), a network interface device 26, processor(s) 28, memory devices 30, and a power supply 32 located on a printed circuit board 34, although the API driven radiofrequency frontend device 12(1) may include other types and/or numbers of elements in other combinations, such as the additional elements shown in FIGS. 2A, 2B, and 3, such as baseband filters, filter inductors, filter capacitors, a power regulator, and a DC power connector, by way of example only. In one example, the API driven radiofrequency frontend device 12(1) is a millimeter wave wireless radiofrequency frontend configured and monitored through an API interface specifically designed for software defined networks.

The API driven radiofrequency frontend device 12(1) of the present technology advantageously allows for a lower complexity full duplex wireless radio design that removes the network control functions from the device and presents an easy to use approach using a simple API. Thus, the API radiofrequency device 12(1) of the present technology does not need to operate as an independent network element with its own network controller. This reduces the number of elements required and simplifies the radiofrequency design, which allows for a smaller footprint and reduced power consumption. Further, a network control administrator, whether hosted on a simple computer or on a cloud based SDN network (such as the remote source(s) 18(1)-18(n) shown in FIG. 1), can easily communicate with the wireless terminal provided by API driven radiofrequency frontend device 12(1) based on a set of well-defined API calls stored at the remote source(s) 18(1)-18(n). Not only is this a much simpler network management approach, but it also allows rapid customization and interfacing for specific networking applications within the context of the SDN.

Referring now to FIGS. 2A and 3, the transceiver device 22 includes a transmitter IC 36 and a receiver IC 38, each coupled to a diplexer 40, as well as transmitter and receiver local oscillator ICs 42 and 44, respectively. The mmWave transmitter IC 36 and receiver IC 38 provide electromagnetic radiofrequency interfaces coupled through waveguide ports that are designed to be connected directly to the diplexer 40, which in this example is a frequency filter type diplexer enabling simultaneous radiofrequency transmission and reception at a common antenna port by using a different transmit and receive frequency that forms the basis for frequency division duplex (FDD). Any type of waveguide interfaced antenna can be used with the radio terminal provided by the transceiver 22. In an example, the frequencies used are between 71 and 76 GHz for one direction in the duplex pair, and between 81 and 86 GHz for the other direction. Other mmWave frequencies can be used and are anticipated between 30 GHz up through 300 GHz. In one example, multiple size antennas can be interfaced to the diplexer 40 antenna port of the API driven radiofrequency frontend device 12(1), allowing mmWave communications, for example, at distances up to 10 km.

The transceiver device 22 is coupled to the modem 24. The modem 24 is responsible for the wireless airframe creation, quadrature amplitude modulation and demodulation mapping, digital to analog conversion for transmission and analog to digital conversion for reception. In this example, the modem 24 is a full duplex device designed for simultaneous transmission and reception resulting in very low network latency. The modem 24 provides analog baseband signals 25 for transmission and reception which are provided to the transmitter and receiver devices 36 and 38, respectively.

The API driven radiofrequency device 12(1) includes one or more API interface devices 16(1)-16(4) dedicated for receiving API calls, as described in further detail below. Although four API interface devices are illustrated and described other types and/or numbers of API interfaces could be employed. In one example, API interface device 16(1) is configured for API management at network speeds up to 1 Gbps through an Ethernet 1 Gbps small form factor pluggable (SFP) transceiver wired interface 46 connected to a 1 Gbps physical layer interface circuit (PHY) 48, which in turn is connected via its media independent interface (MII), to processor(s) 28, which in this example is an advanced RISC architecture (ARM) processor. In addition, in some examples, the API driven radiofrequency device 12(1) also includes wireless API interface devices 16(2)-16(4) for carrier, wireless LAN or Wi-Fi, and Bluetooth wireless interfaces, respectively, as shown in FIG. 3. The wireless API interfaces 16(2)-16(4) are connected via their respective serial ports to the ARM processor 28. API access from the remote source(s) 18(1)-18(n) is possible through any combination of the API interfaces 16(1)-16(4) or through a single one of the API interfaces 16(1)-16(4).

The API driven radiofrequency device 12(1) in this example also includes the network interface device 26 for network communications. In one example, the network interface device 26 is intended for the main wireless payload traffic through an Ethernet 10 Gbps SFP 50 that connects to a 10 Gbps PHY circuit 52. The 10 Gbps PHY circuit 52 is connected via its 10 Gbps attachment unit interface (XAUI) directly to the high speed modem 24 component. Other payload traffic rates are anticipated, such as 25 Gbps with a corresponding PHY interface using 25 GAUI, 50 Gbps with a corresponding PHY interface using 50 GAUI, and 100 Gbps with a corresponding PHY interface of 100 GAUI.

The one or more processors 28 of the API driven radiofrequency frontend device 12(1) may execute programmed instructions stored in the one or more memory devices 30 for the any number of the functions described and illustrated herein. In one example, the processor(s) 28 receive one or more API calls from one or more of the API interface devices 16(1)-16(4) for monitoring or controlling the transceiver 22. In yet another example, the processor(s) 28 execute one or more monitor or control functions for the transceiver 22 based on the received API calls from the remote source(s) 18(1)-18(n). The processor(s) 28 may include one or more CPUs, GPUs, or general purpose processors with one or more processing cores, for example, although other types of processor(s) can also be used such as FPGA devices.

In one example, the one or more processors 28 include the ARM CPU as shown in FIG. 3. In this example, the ARM CPU is connected via multiple individual digital serial interfaces and/or bussed serial interfaces to the other components on the printed circuit board 34. In an example, a serial peripheral interface (SPI) is used for control and monitoring communications between the ARM and the other components. In another example, an inter-integrated circuit (I2C) interface is used. In yet another example, a universal asynchronous receiver-transmitter (UART) type of interface is used. Any combination and number of interfaces can be used and will depend in the specific device input/output (I/O) architecture.

In one example, the one or more processors 28 also include a modem control processor as shown in FIG. 3. In this example, the modem control processor executes modem internal API software that in turn is configured, controlled, and monitored from the ARM CPU through a serial port connection from the ARM CPU to the modem control processor. Although two separate processors are described, it is to be understood that in some examples a single processor can be utilized to perform the operations discussed herein.

The one or more memory devices 30 store these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the one or more memory devices 30.

Accordingly, the one or more memory devices 30 of the API driven radiofrequency frontend device 12(1) can store one or more applications or programs that can include computer executable instructions that, when executed by the processor(s) 28 cause the API driven radiofrequency frontend device 12(1) to perform actions described below. The application(s) can be implemented as modules, threads, pipes, streams, or components of other applications. Further, the application(s) can be implemented as operating system extensions, module, plugins, or the like.

Referring again to FIGS. 2A, 2B, and 3, the API driven radiofrequency frontend device 12(1) also includes power supply 32 located on the printed circuit board 34. In one example, API driven radiofrequency frontend device 12(1) can wirelessly transport data traffic at 10 Gbps full duplex and requires less than 50 watts of power for operation as a result of the simplified design, which allows for a more compact power supply 32. Thus, the power supply 32 can be sized to provide sufficient power, although other power supplies could be employed.

Referring again to FIG. 2, the elements of the API driven radiofrequency frontend device 12(1) are located on the printed circuit board 34. The use of API calls from the remote source(s) 18(1)-18(n) enables monitoring and control of the API driven radiofrequency frontend device 12(1) from the remote source(s) 18(1)-18(n) without the need for a network controller or an Ethernet switch, or other network related elements, on the printed circuit board 34. In one example, the API driven radiofrequency frontend device 12(1) is located on a printed circuit board area having dimensions about 6 inches by 6 inches, allowing it to be incorporated into an enclosure with similar dimensions resulting in a small total volume, although other printed circuit board dimensions may be employed. This results in a smaller area or footprint for installation. The smaller footprint opens applications that were previously prohibited using larger radio terminal designs.

Although the exemplary API driven radiofrequency frontend device 12(1) is described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

Figure 4:
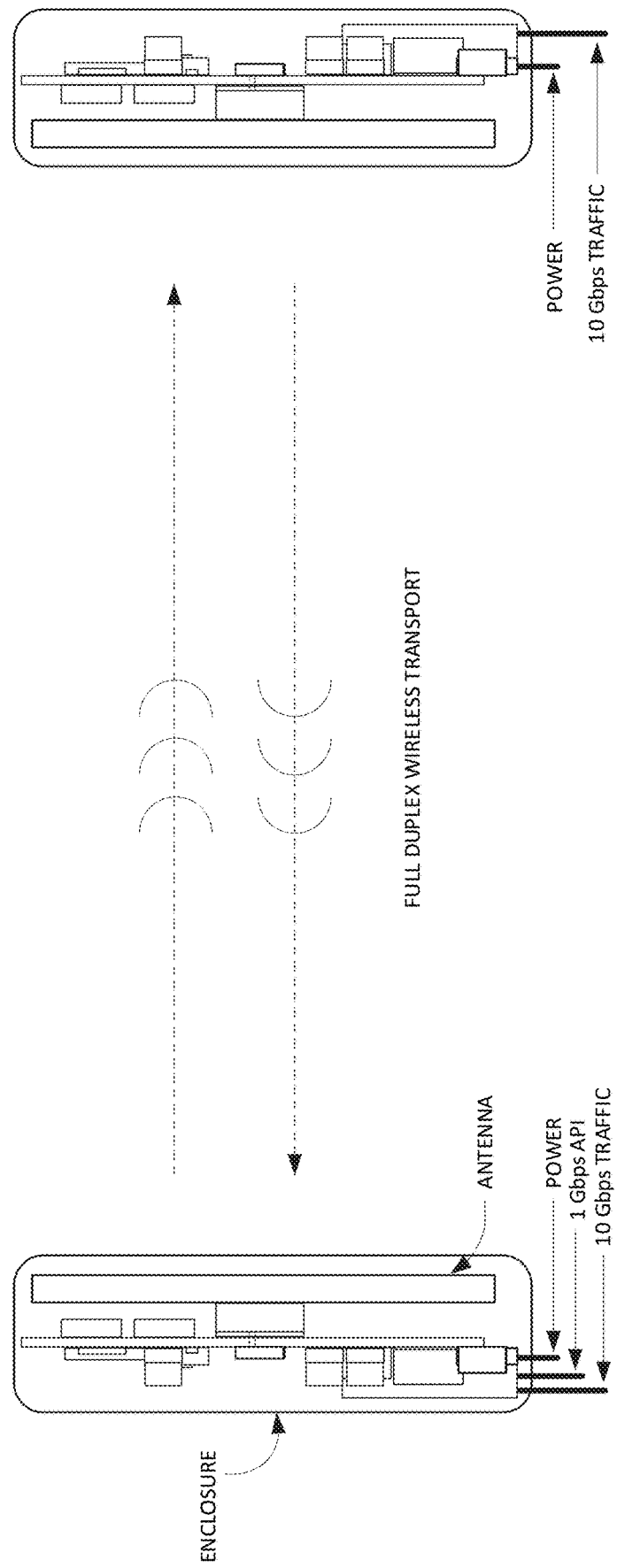
FIG. 4 is an illustration of the API driven radiofrequency frontend device of the present technology operating as a full duplex link with another radiofrequency device.

Referring now to FIG. 4, in one example, two API driven radiofrequency frontend devices 12(1) and 12(2) can be configured as a full duplex mmWave link, and can be installed at an arbitrary distance from the network management system (remote source) since the API can be connected via any LAN or WAN connection. In this way, the API driven radiofrequency frontend devices 12(1) and 12(2) are remote from the management system, such as the remote sources 18(1)-18(n) shown in FIG. 1. As an example, as shown in FIG. 4, the API driven radiofrequency frontend devices 12(1) and 12(2) are configured as a full duplex mmWave link, can be managed from one end of the link with a single API connection since the API driven radiofrequency frontend device software supports out of band management communications between ARM CPUs, for example. As another example, the API driven radiofrequency frontend devices 12(1) and 12(2) in a link can both include, and be attached to the management system, through API connections.

An exemplary operation of the API driven radiofrequency frontend device 12(1) will now be described with reference to FIGS. 1-4. First, the API driven radiofrequency frontend device 12(1) receives one or more API calls through one or more of the API interface devices 16(1)-16(4) for monitoring or controlling the transceiver device 22. The API calls are received from the remote source(s) 18(1)-18(n) as shown in FIG. 1, which may be part of an SDN, which can provide remote management of the API driven radiofrequency frontend device 12(1). In this example, the API call comes into the terminal via the 1 Gbps API interface device 16(1) as shown in FIGS. 2A and 3, although the API call may be received at one of the one or more API interface devices such as the wireless API interface devices 16(2)-16(4) shown in FIG. 3. The origination of the query can be from the remote source(s) 18(1)-18(n) shown in FIG. 1, which can be an individual computer running specific network management software, a network management system that is connected to multiple devices through a LAN or WAN or through the Internet, or a virtualized SDN network within a cloud based management system. The structure of the API call and data format will depend upon the desired protocol from the management system and can be custom configured. The design of the protocol and data structure is easily programmed via the processor(s) 28, such as ARM CPU executable software, for example, and is intended to be configured for specific network management systems. The use of the API calls enables monitoring and control of the API driven radiofrequency frontend device 12(1) from the remote source(s) 18(1)-18(n), for example, without the need for a network controller or an Ethernet switch on the printed circuit board 34 of the API driven radiofrequency frontend device 12(1).

Next, the one or more processors 28 of the API driven radiofrequency frontend device 12(1) execute one or more monitor or control functions for the transceiver 22 based on the received API calls from the remote source(s) 18(1)-18(*n*). In one example, the processor(s) 28, such as an ARM CPU, executes software that interprets the API call by executing lower level routines as defined by the specific API call. In this way the API is kept at an abstracted or high level such that the originating software executed by the remote source does not require any knowledge or detailed information of the underlying operations necessary to respond to the API call. By keeping the radiofrequency frontend detailed operations isolated from the API call (remote) source, such as an SDN network management system, the work required to produce the API queries is simplified.

In one example, an API read-only query is sent to the remote API driven radiofrequency frontend device 12(1) to monitor one or more functions of the API driven radiofrequency frontend device 12(1). For example, an API call can be received asking for a numerical value of the current transmitter power of the transceiver 22. The one or more processors 28 of the API driven radiofrequency device 12(1) can be configured to receive status data from the transceiver 22, for example, at regular intervals, although status data could be received from any of the elements of the API driven radiofrequency frontend device 12(1). The one or more processors 28 then execute the monitor function to output the status data related to the transceiver 22 to the remote source(s) 18(1)-18(*n*) based on the received API call. For example, the numerical value of the current transmitter power can be provided to the remote source(s) 18(1)-18(*n*).

In one another example, an API call may be received for executing a control function of one or more elements of the API driven radiofrequency frontend device 12(1). As one example, an API write-only query is sent to the remote API driven radiofrequency frontend device 12(1) setting the receiver frequency to a specific numerical value, through the receiver local oscillator 44. The one or more processors 28 execute the desired function to set the receiver frequency based on the remote management from the remote source(s) 18(1)-18(*n*).

Although example monitor and control functions that may be performed utilizing API calls are described, these examples are not exhaustive and the API calls can be configured for any number of monitor or control functions for any of the elements of the API driven radiofrequency frontend device 12(1).

Accordingly, the present technology provides a number of advantages including providing a lower complexity full duplex wireless radio design that is driven by API calls received through a dedicated interface and thus does not need to perform any network functionality. This reduces the size and power requirements for the radio device, which allows the device to be employed in a number of applications that require a small footprint millimeter radio device. Further, the wireless terminal can be operated remotely without the need for the remote source to interface with any specific networking applications for communicating with the radio device. Thus, the wireless terminal can be easily introduced into an SDN, for example.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A radiofrequency frontend device comprising:
    a transceiver configured to transmit and receive electromagnetic radiation in a Millimeter wave (mmWave) radio frequency (RF) spectrum;
    one or more application programming interface (API) interface devices configured to receive API calls from a remote source;
    a processor coupled to the one or more API interface devices and the transceiver;
    a memory comprising programmed instructions stored in the memory, the processor configured to execute the programmed instructions stored in the memory to:
        receive one or more API calls from the one or more API interface devices for monitoring or controlling the transceiver;
        execute one or more monitor or control functions for the transceiver based on the received API calls from the remote source, wherein the processor, the memory, and the transceiver are configured to enable monitoring and control from the remote source without a network controller; and
        output the received API calls for monitoring or controlling the transceiver to another radiofrequency frontend device to provide a wireless link to monitor or control the another radiofrequency frontend device from the remote source.

2. The radiofrequency frontend device of claim 1, wherein the Millimeter wave (mmWave) radio frequency (RF) spectrum ranges between about 30 GHz to about 300 GHz.

3. The radiofrequency frontend device of claim 1, wherein at least one of the one or more API interface devices is a wireless interface device.

4. The radiofrequency frontend device of claim 1 further comprising:
    a printed circuit board comprising an area configured to support at least the processor, the memory, and the transceiver.

5. The radiofrequency frontend device of claim 4, wherein the printed circuit board has dimensions of about 6 inches by 6 inches, or less.

6. The radiofrequency frontend device of claim 1, wherein the processor, the memory, and the transceiver are configured to enable monitoring and control from the remote source without an Ethernet switch.

7. The radiofrequency frontend device of claim 1 further comprising:
    a power supply coupled to the processor and the transceiver configured to supply less than 50 watts to power the radiofrequency frontend device.

8. The radiofrequency frontend device of claim 1, wherein the processor is further configured to be capable of executing the stored programmed instructions to:
receive status data from the transceiver; and
execute the one or monitor functions to output the status data related to the transceiver to the remote source based on the received API call.

9. The radiofrequency frontend device of claim 8, wherein the status data from the transceiver is received at regular intervals.

10. The radiofrequency frontend device of claim 1, wherein the processors are further configured to be capable of executing the stored programmed instructions to:
execute the one or more control functions to control one or more operations of the transceiver based on the received API call providing control instructions for the one or more operations of the transceiver.

11. The radiofrequency frontend device of claim 10, wherein the one or more operations of the transceiver relate to one or more characteristics of the transmitted and received electromagnetic radiation from the transceiver.

12. The radiofrequency frontend device of claim 1 further comprising:
a network traffic interface device separate from the one or more API interface devices, the network traffic interface configured to receive a network payload for wireless data communications for the transceiver.

13. The radiofrequency frontend device of claim 12, wherein the wireless data communications comprise full duplex wireless radio communications.

14. A method of making a radiofrequency frontend device, the method comprising:
providing a transceiver configured to transmit and receive electromagnetic radiation in a Millimeter wave (mmWave) radio frequency (RF) spectrum;
providing one or more application programming interface (API) interface devices configured to receive API calls from a remote source;
coupling a processor to the one or more API interface devices and the transceiver;
providing a memory comprising programmed instructions stored in the memory, the processor configured to execute the programmed instructions stored in the memory to:
receive one or more API calls from the one or more API interface devices for monitoring or controlling the transceiver;
execute one or more monitor or control functions for the transceiver based on the received API calls from the remote source, wherein the processor, the memory, and the transceiver are configured to enable monitoring and control from the remote source without a network controller; and
output the received API calls for monitoring or controlling the transceiver to another radiofrequency frontend device to provide a wireless link to monitor or control the another radiofrequency frontend device from the remote source.

15. The method of claim 14, wherein the Millimeter wave (mmWave) radio frequency (RF) spectrum ranges between about 30 GHz to about 300 GHz.

16. The method of claim 14, wherein at least one of the one or more API interface devices is a wireless interface device.

17. The method of claim 14 further comprising:
providing a printed circuit board comprising an area configured to support at least the processor, the memory and the transceiver.

18. The method of claim 17, wherein the printed circuit board has dimensions of about 6 inches by 6 inches, or less.

19. The method of claim 14, wherein the processor, the memory, and the transceiver are configured to enable monitoring and control from the remote source without an Ethernet switch.

20. The method of claim 14 further comprising:
providing a power supply coupled to the processor and the transceiver configured to supply less than 50 watts to power the radiofrequency frontend device.

21. The method of claim 14, wherein the processor is further configured to be capable of executing the stored programmed instructions to:
receive status data from the transceiver; and
execute the one or monitor functions to output the status data related to the transceiver to the remote source based on the received API call.

22. The method of claim 21, wherein the status data from the transceiver is received at regular intervals.

23. The method of claim 14, wherein the processor is further configured to be capable of executing the stored programmed instructions to:
execute the one or more control functions to control one or more operations of the transceiver based on the received API call providing control instructions for the one or more operations of the transceiver.

24. The method of claim 23, wherein the one or more operations of the transceiver relate to one or more characteristics of the transmitted and received electromagnetic radiation from the transceiver.

25. The method of claim 14 further comprising:
providing a network traffic interface device separate from the one or more API interface devices, the network traffic interface configured to receive a network payload for wireless data communications for the transceiver.

26. The method of claim 25, wherein the wireless data communications comprise full duplex wireless radio communications.

* * * * *